FIG. I
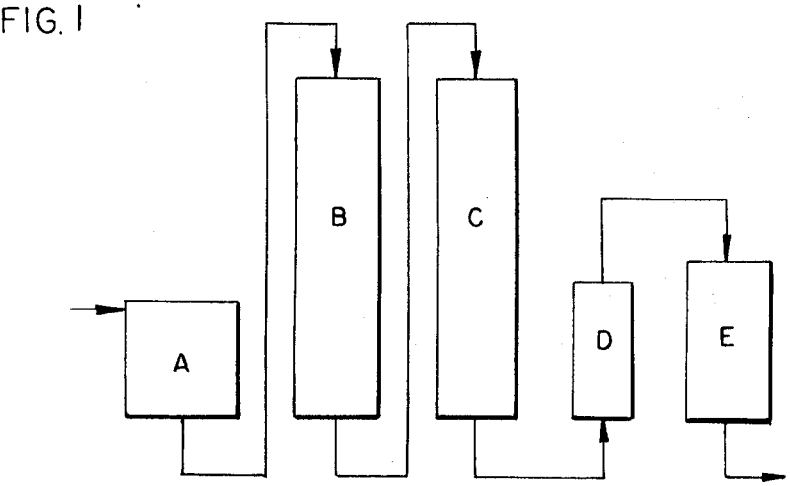
FIG. 2
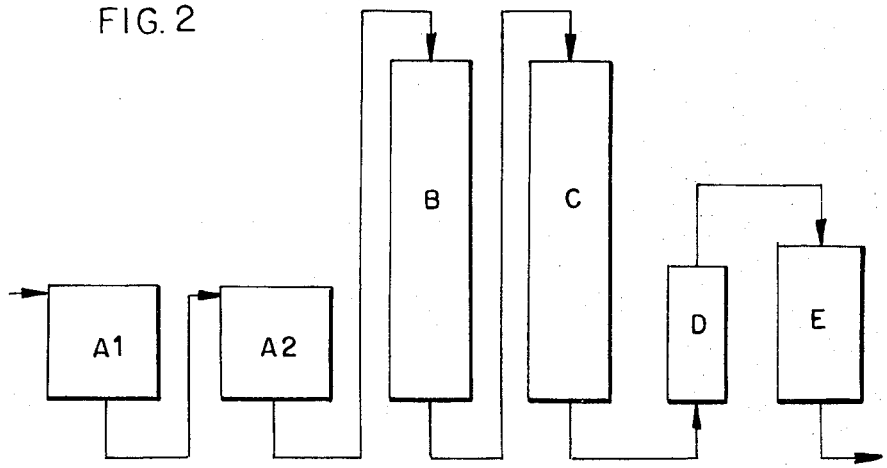

United States Patent Office 3,658,946
Patented Apr. 25, 1972

3,658,946
PRODUCTION OF RUBBER-MODIFIED VINYLAROMATIC POLYMERS
Klaus Bronstert, Carlsberg, Karl Buchholz and Adolf Echte, Ludwigshafen, and Juergen Hofmann, Beindersheim, Germany, assignors to Badische Anilin- & Soda-Fabrik Aktiengesellschaft, Ludwigshafen (Rhine), Germany
Filed May 8, 1969, Ser. No. 822,997
Claims priority, application Germany, May 11, 1968,
P 17 70 392.3
Int. Cl. C08f 15/00
U.S. Cl. 260—878 R 3 Claims

ABSTRACT OF THE DISCLOSURE

Process for the production of impact-resistant polymers by the continuous polymerization of a solution of a diene elastomer or elastomeric copolymer of ethylene and propylene, the starting materials being first partially polymerized to such an extent that the solids content of the mixture is 1.1 to 2 times the content of diene elastomer but not more than 16% by weight, then introduced into an isothermal polymerization stage where a mixture containing less than 50% by weight of solids is prepared at a temperature of from 50° to 150° C. while mixing, which mixture is totally polymerized in the downstream continuous polymerization stages at a temperature of up to 250° C. to give a mixture containing more than 60% by weight of solids, and then freed in a conventional manner from volatile constituents.

---

The invention relates to a process for the production of impact-resistant polymers by continuous polymerization of solutions of rubber in vinylaromatic monomers, preferably styrene, in the presence or absence of an indifferent organic solvent and other compounds which are copolymerizable with vinylaromatic monomers.

It is known from U.S. patent specification No. 2,694,-692 that impact-resistant polymers can be prepared by subjecting solutions of natural or synthetic rubbers in vinylaromatic monomers, preferably styrene, to thermal polymerization. The term "monovinylaromatic compounds" as used in the said U.S. patent specification means styrene and its derivatives bearing alkyl radicals in the ring and side chains, and the various commercially available isomeric chloro-styrenes or mixtures of the said monovinylaromatic compounds. These monovinylaromatic monomers may be polymerized alone or in admixture with other monomers having an ethylenically unsaturated C=C bond (which are capable of being copolymerized) in amounts of up to 25% by weight. The following are examples of these comonomers: acrylic acid, methacrylic acid, esters and nitriles thereof, maleic acid, maleic anhydride and esters thereof. Polymerization may be carried out continuously or batchwise.

An industrial development of this polymerization process is described in U.S. patent specification No. 3,243,-481. According to this process, a solution of a natural or synthetic rubber in styrene or a mixture of monomers containing styrene in a predominant amount is polymerized continuously in three stages in the presence of an indifferent solvent and in the presence or absence of a stabilizer, regulator, lubricant and the like.

A preferred industrial method is as follows:

In the first stage (also known as the prepolymerization stage) partial polymerization takes place in a stirred vessel under isothermal conditions at a temperature of from 50° to 150° C. in such a manner that the solids content is from 1 to 35%, preferably from 7 to 15%, by weight (including the amount of rubber added) and the polymerizing mixture is agitated in such a way that the diameter of the rubber particles in the end product is from 2 to 25 microns.

In the second polymerization stage, polymerization is continued in a twin-tube reactor, the material flowing downwardly, at temperatures of from 85° to 130° C. The solids content in the polymerizing mixture thus rises during passage through the reactor, with or without gentle stirring, to from 30 to 50% by weight (including the amount of added rubber).

Polymerization takes place in the third stage also in a tubular reactor, with or without gentle stirring, so that the polymer content in the polymerizing mixture rises to about 80% by weight (including the amount of rubber added). The temperature of the polymerizing mixture here is from 125° to 185° C.

The reaction mixture is then heated to from 220° to 260° C. while flowing through a tubular heat exchanger and then introduced into a zone at lower pressure so that the unreacted monomers and the indifferent solvent can be withdrawn in vaporous form.

In a polymerization process of this type, the reaction conditions have a decisive influence on the properties of the finished product. Impact-resistant polystyrene consists of a solid dispersion of rubber particles in a polystyrene base material. It has been found that a diameter of from 1 to 25 microns of these rubber particles is optimal for the mechanical properties of such molding materials. It is further known that the rubber is not present in the end product in unchanged condition but has been grafted with polystyrene to a greater or lesser extent during polymerization. The degree of grafting may be ascertained by determining the amount of toluene-insoluble gel contained in the polymer. Optimal properties of the impact-resistant styrene polymer are obtained when this gel content is from 3.5 to 6.5 times the amount of rubber used. The properties of the impact-resistant polystyrene are also determined by the degree of crosslinking of the rubber components, measured by the parameter known as the swelling index which is determined by the weight ratio of gel swollen in toluene to dried gel. Finally, the mean molecular weight of the polystyrene is of special importance for the processing properties, for example in shaping by injection molding or in the deep drawing of extruded boards. The mean molecular weight may be adjusted to the desired value in the usual way by means of regulators or by suitable temperature control during polymerization.

U.S. patent specification No. 3,243,481 furthermore teaches that the size and distribution of the rubber particles in the impact-resistant polystyrene finally obtained can be controlled by varying the stirrer speed or the shear stress on the polymerizing mixture during polymerization. At the beginning of the reaction a homogeneous solution of the rubber in the vinylaromatic monomer is present. In the course of polymerization, however, a phase inversion takes place; if the amount of polymer formed exceeds the amount of rubber originally used, the phase surrounding the rubber particles consists of a solution of styrene polymer in monomer which has not yet been reacted, in which the solution of rubber in monomer is dispersed in the form of fine droplets.

If the stirrer speed is increased during polymerization while the temperature is kept constant and consequently with a conversion ratio of monomer to polymer which is in direct proportion, the diameter of the rubber particles is correspondingly decreased; similarly, it is possible to accelerate polymerization by raising the reaction temperature while the stirrer speed is kept constant. As a result, there is a more rapid increase in the viscosity of the polymerizing mixture and the shear stress on the same so that rubber particles having a smaller diameter are obtained in the end product.

The gel content in impact-resistant polymers is less, the smaller the mean particle size of the rubber particles is at a constant rubber concentration. It is therefore to be expected from what has been known hitherto that the gel content in the end product will decrease with increasing conversion in the first polymerization stage. This is set out in detail in Example 8 of U.S. patent specification No. 2,694,692.

If the requirements as regards the gel content which is optimal for the properties of the end product (from 3.5 to 6.5 times with reference to the total weight of rubber used) and as regards the most advantageous particle size of the rubber (diameter of the rubber particles from 1 to 25 microns) are satisfied, it is found that it is impossible by prior art polymerization methods to increase the conversion ratio of polymer to monomer at will in the first polymerization stage (prepolymerization stage); in the case of conversions above 15% with reference to the weight of monomer used, gel content and rubber particle size decline appreciably and the mechanical properties of the end product are considerably impaired.

It is therefore the object of the invention to obviate the said disadvantages and to provide a polymerization process which makes possible a substantially higher conversion in the first polymerization stage without any undesirable change in the gel content, in the particle size of the rubber particles and in the mechanical properties of the end product.

Accordingly, this invention relates to a process for the production of impact-resistant polymers by continuous polymerization of a solution of an elastomeric polymer in a vinylaromatic monomer, in the presence or absence of other comonomers and an indifferent solvent in which the starting materials are introduced into an isothermal polymerization stage where a mixture containing less than 50% by weight of solids is prepared by polymerization at a temperature of from 50° to 150° C. while mixing, said mixture subsequently being polymerized continuously in a downstream polymerization stage at a temperature of up to 250° C. to give a mixture containing more than 60% by weight of solids, and then freed by a conventional method from volatile constituents, which consists in prepolymerizing the starting materials, prior to supplying them to the said isothermal polymerization stage, to such an extent that the solids content of the mixture is from 1.1 to 2 times the content of diene polymer but not more than 16% by weight.

It is extremely surprising that impact-resistant polymers are obtained by the process according to this invention which with the same or smaller particle size of the incorporated rubber particles has at least the same or, advantageously, or higher gel content as compared with prior art polymers although polymerization in the first polymerization stage is not, as has hitherto been the case carried out in at least two successive, preferably isothermal, stirred zones. Moreover, the solids content, prior to introduction of the reaction mixture into the tubular reactors can be increased in an unexpected manner—which means a valuable increase in the space/time yield—without the advantageous properties of the polymers being impaired.

The improvement in the property spectrum of the products prepared according to the invention, measured by the gel content, is all the more surprising because the increase in the solids content as a result of the prepolymerization according to the invention is practically negligible as compared with the total conversion. In addition to the unexpected increase in the gel content it is observed that the mean size of the rubber particles in polymers prepared by the process according to the invention is smaller and their distribution is within a narrower range, which is particularly advantageous because a larger number of particles lies in a more favorable size range than has been usual hitherto.

Elastomeric polymers for the purposes of this invention are preferably diene polymers, for example homopolymers and copolymers of conjugated 1,3-dienes having from four to six carbon atoms, such as butadiene and isoprene, or copolymers of predominant amounts of such dienes and other copolymerizable compounds, preferably styrene, acrylonitrile and alkyl esters of acrylic acid and methacrylic acid having from one to eighteen carbon atoms in the alkyl radicals. 1,4-polybutadienes having a fraction of more than 25% in cis-configuration are particularly suitable, as well as copolymers of butadiene and isoprene and copolymers known as block copolymers which consist of polystyrene and polybutadiene blocks. Other elastomeric polymers, for example elastomeric copolymers of ethylene and propylene, may also be used as rubber components in the process according to this invention, as well as mixtures of the said elastomeric polymers with one another. The concentration of rubber in the mixture to be polymerized is generally from 1 to 14%, preferably from 3 to 8%, with reference to the total weight of the mixture to be polymerized.

Vinylaromatic monomers include particularly styrene, styrenes bearing one or more alkyl or aryl radicals as substituents (among which $\alpha$-methylstyrene and nuclear methylated styrenes are particularly suitable, halostyrenes and nitrostyrenes.

The following may be used as comonomers in accordance with this invention: acrylic acid and methacrylic acid and their alkyl esters containing one to eighteen carbon atoms in the alkyl group, preferably butyl acrylate, ethylhexyl acrylate, cyclohexyl acrylate, methyl methacrylate and butyl methacrylate. Other particularly suitable comonomers are acrylonitrile and methacrylonitrile.

The comonomers copolymerizable with the monovinylaromatic compound may generally be used in amounts of from 0 to 25%, preferably from 5 to 20%, by weight with reference to the total weight of the mixture to be polymerized.

Examples of indifferent solvents are aromatic hydrocarbons or mixtures of aromatic hydrocarbons. Preferred representatives of this class of substances are toluene, the isomeric xylenes and ethylbenzene, or mixtures of these aromatic hydrocarbons in any ratio.

The content of indifferent solvent in the mixture of monomers, rubber and solvent is generally from 0 to 20%, preferably from 7 to 15%, by weight with reference to the reaction mixture.

It is an essential feature of the new method that the starting materials, prior to introduction into the isothermal polymerization stage, be prepolymerized to such an extent that the solids content of the mixture is from 1.1 to 2 times the content of diene polymer but not more than 16% by weight.

The process according to the invention is particularly advantageous when prepolymerization of the mixture of starting materials is carried out in such a way that this mixture, prior to being fed into the downstream isothermal polymerization stage, has a solids content which is from 1.2 to 1.7 times the content of elastomeric polymer.

For this purpose the starting mixture is generally heated to a temperature of from 50° to 150° C., preferably from 100° to 120° C., while mixing intimately, until the desired solids content has been reached. Usually from fifteen to ninety minutes are necessary for this purpose. Prepolymerization may be carried out continuously or batchwise. Although advantageous, it is not essential to maintain isothermal conditions.

The prepolymerized mixture of starting materials is then further processed in the usual way by feeding it into an isothermal polymerization stage where it is polymerized at a temperature of from 50° to 150° C., preferably from 100° to 120° C., while mixing intimately, to such an extent that the solids content is less than 50%, preferably from 25 to 45%, by weight.

The mixture thus obtained is then polymerized in one or more tubular reactors to give a mixture containing more than 60%, preferably from 75 to 90%, by weight of solids. In the tubular reactor(s) the temperature and solids concentration rise steadily from the point of entry to the point of exit of the mixture. At the point of entry the temperature and solids content generally correspond to the values of the mixture supplied from the isothermal stage. At the point of exit the temperature is generally from 120° to 200° C., particularly from 140° to 175° C. It is usual to employ for polymerisation in these polymerization stages vertical reactors whose length is a multiple of the diameter and in which the product is only gently stirred. The product may be supplied to the top of the reactor and withdrawn from the bottom or vice versa.

After the mixture leaves the tubular reactor(s), volatile constituents are removed by a conventional method, for example flashing the molten phase into a zone of lower pressure.

The products obtained are valuable molding materials for the production of extremely impact-resistant moldings.

The products obtained are all tested in the same way. The following are measured:

(1) yield point in kp./cm.$^2$;
(2) tensile strength in kp./cm.$^2$;
(3) elongation in percent;

(1) to (3) carried out with molded dumbbell specimens 70 x 12.7 x 3.2 mm. which are pulled apart at a rate of 25 mm./minute at 23°±1° C. during the test.

(4) Vicat number according to VDE 0302 (ASTM D 1525);
(5) melt index in g./5 minutes (nozzle: 1.=8.00 mm., d.=2.1844 mm.; load 4480 g.; temperature 207° C.);
(6) surface roughness in microns, measured with a Surfindicator manufactured by Brush Instruments, USA, on filaments obtained in the melt index test;
(7) gel content in toluene after centrifuging off the insoluble constituents at 2800 g, decanting and drying with any necessary correction of the content found by making allowance for the ash content in percent by weight of the test batch;
(8) swelling index as a ratio of wet weight to dry weight in the gel content test;
(9) K value according to Fikentscher using the decanted solution of the gel content test after dilution to 1.00% by weight in toluene;
(10) particle size and distribution by counting particles belonging to the same size class in light microscope microtome-section photographs. The particle size results from logarithmic plotting of a standard distribution. In the table of values, the numbers of the +2s and —2s limits the determined logarithmically are given.

The invention is illustrated by the examples.

COMPARATIVE EXAMPLE 1

This example is given with reference to FIG. 1 of the drawing.

The following process is carried out in polymerization apparatus according to FIG. 1 (corresponding to Example 8, FIG. 1 in U.S. patent specification No, 3,243,481.

A solution of 4.8 parts by weight of a stereospecific polybutadiene (having a content of 37% by weight of cis-1,4 configuration, 54% by weight of trans-1,4 configuration and 9% by weight of 1,2-vinyl configuration; Mooney viscosity ML–4 at 100° C.=35) in a mixture of 8 parts by weight of ethylbenzene, 2 parts by weight of mineral oil and 90 parts by weight of styrene is introduced continuously into the reactor system.

2500 kg./h. of rubber solution is fed into the stirred vessel A serving as the isothermal polymerization stage (I) (diameter 2200 mm., volume 8 m.$^3$, three-bladed agitator, diameter of the circle swept by blades 1400 mm.). Polymerization is carried out in this reactor A at 110° C. up to a solids content of 15% by weight at a stirrer speed of 30 r.p.m. The reaction mixture is discharged continuously from the reactor and supplied to a tower reactor B (height 5.20 m., volume 10 m.$^3$) serving as polymerization stage (II). Polymerization is carried on in reactor B at a temperature rising from 120° to 140° C. up to a solids content of 60% by weight. The reaction is continued in a second downstream tower reactor C (serving as polymerization stage (III)) of the same size at a temperature rising from 140° to 175° C. up to a solids content of about 80% by weight. The reaction mixture discharged from reactor C is heated in a heat exchanger D to 240° C. and flashed into vessel E under a subatmospheric pressure of 20 mm. Hg. Ethylbenzene and unreacted residual monomers are removed therefrom in gaseous form; the polymer melt is discharged from the vacuum vessel E and granulated. The rubber content of the end product is then 6.0% by weight with reference to the total weight of the molding material.

In Table 1 the test results in column A are compared with those obtained by the process according to this invention in column B (see Example 2).

EXAMPLE 2

The process according to this invention is carried out in the polymerization apparatus according to FIG. 2 as follows:

A solution of 4.8 parts by weight of a stereospecific polybutadiene (having a content of 37% by weight of cis-1,4 configuration, 54% by weight of trans-1,4 configuration and 9% by weight of 1,2-vinyl configuration; Mooney viscosity ML–4 at 100° C.=35) in a mixture of 8 parts by weight of ethylbenzene, 2 parts by weight of mineral oil and 90 parts by weight of styrene introduced continuously into the reaction system.

The apparatus according to FIG. 2 differs from that according to FIG. 1 in that prepolymerisation of the starting materials takes place in a well stirred vessel A1 under isothermal conditions (diameter of vessel 1400 mm., volume 2 m.$^3$, three-bladed agitator, diameter of the circle swept by blades 700 mm.). The stirrer speed may be varied between 20 to 150 r.p.m. No effect on the surface structure of the end product can be detected. In the present example the stirrer speed is 80 r.p.m.

Polymerization is carried out under the following conditions:

Rubber solution throughput: 2500 kg./h.
Temperatures in the individual reactors:
    A1 110° C.
    A2 125° C.
    B rising from 125° to 140° C.
    C rising from 140° to 175° C.
Solids content in product discharged from reactor:
    After A1 7.5% by weight
    After A2 35.0% by weight
    After B 60.0% by weight
    After C 85.0% by weight
Stirrer speed in reactor:
    A1 80 r.p.m.
    A2 32 r.p.m.
    B 5 r.p.m.
    C 1 r.p.m.

The properties of the product are determined as described and the results of the tests are given in Table 1.

TABLE 1

|  | A | B |
|---|---|---|
| Yield point in kp./cm.² | 230 | 200 |
| Tensile strength in kp./cm.² | 230 | 210 |
| Elongation in percent | 30 | 34 |
| Vicat number (according to VDE 0302) | 91 | 91 |
| Melt index in g./5 minutes | 3.0 | 3.0 |
| Surface roughness in microns | 1.2 | 0.9 |
| Gel content in percent | 21 | 25 |
| Swelling index | 10.5 | 10.5 |
| K value according to Fikentscher | 57 | 57 |
| Mean particle size in microns | 3.4 | 2.5 |
| Particle size distribution in microns: |  |  |
| +2s | 8.8 | 6.1 |
| −2s | 1.1 | 1.1 |

EXAMPLE 3

A solution of 6.4 parts by weight of a stereospecific polybutadiene (having a gel content of 37% by weight in cis-1,4 configuration, 54% by weight in trans-1,4 configuration and 9% by weight in 1,2-vinyl configuration; Mooney viscosity ML–4 at 100° C.=35) in a mixture of 8 parts by weight of ethylbenzene, 2 parts by weight of mineral oil and 90 parts by weight of styrene is polymerized continuously as described in Example 2 in an apparatus according to FIG. 2. The reaction conditions are the same as in Example 2. The rubber content of impact-resistant polystyrene prepared by this process is 8% by weight with reference to the total weight of the molding material. The test results are given in column B of Table 2.

For comparison, an identical rubber solution is polymerized according to the process and under the reaction condition of Example 1 in an apparatus according to FIG. 1. The results obtained with the comparative product are given in column A of Table 2.

TABLE 2

|  | A | B |
|---|---|---|
| Yield point in kp./cm.² | 220 | 190 |
| Tensile strength in kp./cm.² | 220 | 205 |
| Elongation in percent | 33 | 38 |
| Vicat number according to VDE 0302 | 91 | 91 |
| Melt index in g./5 minutes | 2.8 | 2.8 |
| Surface roughness in microns | 1.1 | 0.75 |
| Gel content in percent | 29 | 35 |
| Swelling index | 10.2 | 10.3 |
| K value according to Fikentscher | 55 | 55 |
| Mean particle size in microns | 3.2 | 2.4 |
| Particle size distribution in microns: |  |  |
| +2s | 7.1 | 4.9 |
| −2s | 1.4 | 1.2 |

EXAMPLE 4

A solution of 4.8 parts by weight of styrene-butadiene rubber (23.5% by weight of styrene and 76.5% by weight of butadiene; Mooney viscosity ML₄=50) in a mixture of 8 parts by weight of ethylbenzene, 2 parts by weight of mineral oil and 9 parts by weight of styrene is polymerized continuously as described in Example 2 in an apparatus according to FIG. 2. The reaction conditions are the same as in Example 2. The test results, obtained with an impact-resistant polystyrene prepared by this method are given in column B of Table 3.

For comparison, an identical rubber solution is polymerized by the method and under the conditions of Example 1 in an apparatus according to FIG. 1. The test results obtained with the comparative product are given in column A of Table 3.

TABLE 3

|  | A | B |
|---|---|---|
| Yield point in kp./cm.² | 260 | 240 |
| Tensile strength in kp./cm.² | 225 | 220 |
| Elongation in percent | 31 | 34 |
| Vicat number according to VDE 0302 | 88 | 88.5 |
| Melt index in g./5 minutes | 4.2 | 4.4 |
| Surface roughness in microns | 0.9 | 0.65 |
| Gel content in percent | 13.5 | 17.0 |
| Swelling index | 11.2 | 11.0 |
| K value according to Fikentscher | 56.1 | 55.7 |
| Mean particle size in microns | 3.0 | 2.2 |
| Particle size distribution in microns: |  |  |
| +2s | 6.6 | 4.4 |
| −2s | 1.4 | 1.1 |

Impact-resistant polymers prepared by the process according to the invention have distinctly better properties than prior art products of the same composition; in particular the surface of moldings prepared therefrom is smoother, the gel content in the molding material is higher, and the mean particle size and distribution of the incorporated rubber particles are changed in an advantageous manner.

We claim:

1. A process for the production of impact-resistant polymers by the continuous polymerization of a solution of an elastomeric polymer selected from the group consisting of elastomers of conjugated 1,3-dienes of 4 to 6 carbon atoms and elastomeric copolymers of ethylene and propylene in a vinylaromatic monomer selected from the group consisting of styrene, α-methylstyrene and nuclear methylated styrenes, the starting materials being introduced into an isothermal polymerization stage where a mixture containing less than 50% by weight of solids is prepared by polymerization at a temperature of from 50° to 150° C. while mixing, said mixture subsequently being continuously polymerized in a downstream polymerization stage at a temperature of up to 250° C. to give a mixture containing more than 60% by weight of solids, and then freed from volatile constituents by a conventional method, wherein the starting materials, prior to being fed into the said isothermal polymerization stage are prepolymerized to such an extent that the solids content of the mixture is from 1.1 to 2 times the content of elastomeric polymer but not more than 16% by weight.

2. A process as claimed in claim 1 wherein prepolymerization lasts for fifteen minutes to ninety minutes.

3. A process as claimed in claim 1 wherein polymerization is carried out in the presence of up to 20% of an inert solvent.

References Cited

UNITED STATES PATENTS 2,694,692  11/1954  Ames et al. _____ 260—45.5
3,243,481  3/1966  Ruffing et al. _____ 260—880

JOSEPH L. SCHOFER, Primary Examiner

S. M. LEVIN, Assistant Examiner

U.S. Cl. X.R.

260—83.7, 94.2, 879, 880 R